May 8, 1956   K. A. KLINGLER   2,744,797
JOURNAL LUBRICATING DEVICE

Filed June 10, 1953   2 Sheets-Sheet 1

Inventor
Karl A. Klingler
by Parker & Carter
Attorneys

May 8, 1956  K. A. KLINGLER  2,744,797
JOURNAL LUBRICATING DEVICE
Filed June 10, 1953  2 Sheets-Sheet 2

Inventor
Karl A. Klingler
by Parker & Carter
Attorneys

United States Patent Office 2,744,797
Patented May 8, 1956

2,744,797

JOURNAL LUBRICATING DEVICE

Karl A. Klingler, Naperville, Ill.

Application June 10, 1953, Serial No. 360,743

7 Claims. (Cl. 308—90)

This invention is directed to an improved lubricating system for railway journal boxes.

One object of my invention is the provision of a lubricating system which will distribute a thin film of lubricant on the axle associated with the journal box without contact of the axle with a lubricant reservoir in the lower portion of the journal box.

Another object of this invention is to provide a system for distributing lubricant on an axle associated with a journal box irrespective of the level of lubricant in the lubricant reservoir formed in the journal box.

Another object of this invention is to provide a lubricating attachment for railway journal boxes that requires relatively minor changes in the journal box proper.

Other objects will appear from time to time in the course of the ensuing specification and claims.

Referring generally now to the drawings.

Figure 1:
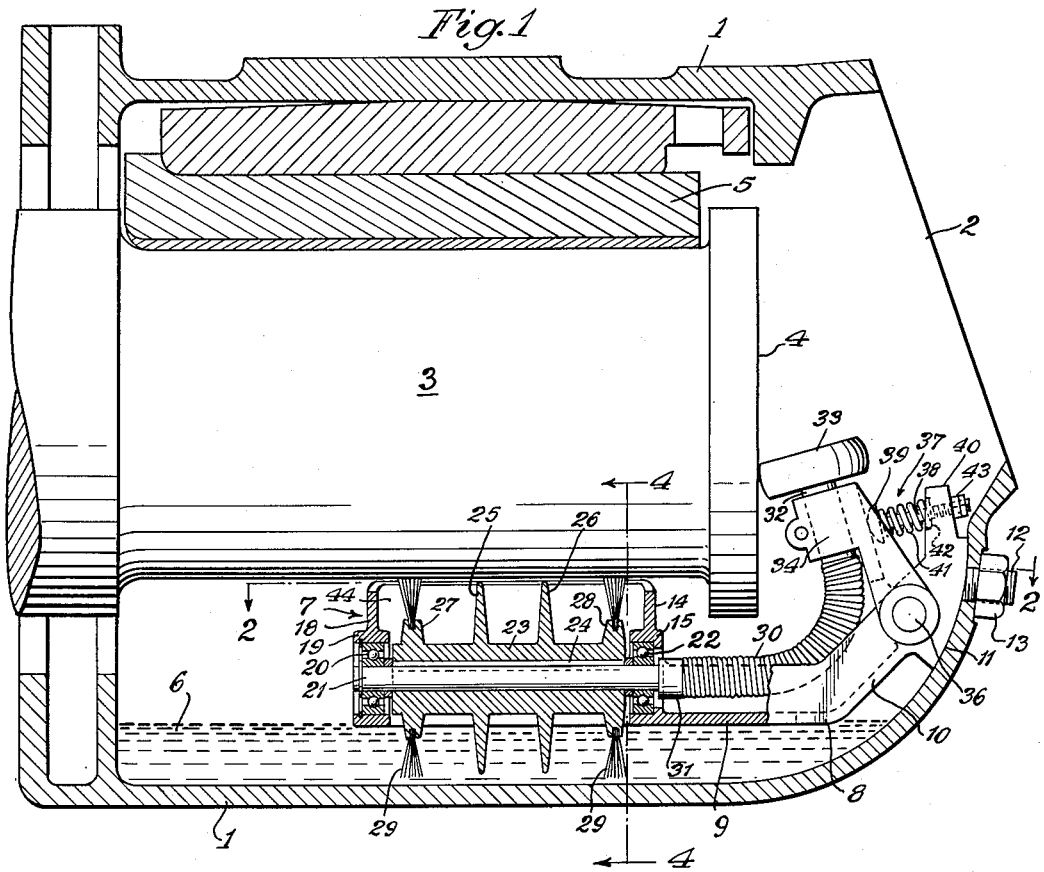
Fig. 1 is a side elevational view of a conventional journal box provided with my lubricating system with certain portions being shown in sectional form for purposes of clarity.

Referring specifically now to the drawings, wherein like elements are designated by like characters throughout; and in the first instance to Fig. 1, 1 represents a conventional journal box having an access opening 2 in one end thereof. 3 represents the conventional axle disposed within the journal box and having an end face 4 adjacent to the opening 2 of the journal box 1. 5 represents the brass in bearing-engagement with axle 3. A pool of any conventional lubricant 6 is confined in the lower portion of the journal box 1. Preferably, the level of lubricant is maintained at a point lower than the lowermost portion of the axle 3. According to my invention, lubricant is conveyed from the reservoir in the lower portion of the box by means of a distributor, designated generally at 7.

A channel-shaped supporting member 8, which may be formed of an iron casting, or any other suitable material, has one portion 9 adapted to extend generally parallel to the axis of the axle 3 and another portion 10 extending at an angle to the portion 9. The portion 10 is provided with a curvilinear surface 11 adapted to fit snugly against the surface of the journal box proper and be attached thereto by means of a bolt 12 which is passed through the attaching portion 11 and the wall of the journal box proper. Thus, the supporting member 8 may be attached to the journal box by simply drilling a hole through the wall of the journal box to accommodate the bolt 12. A nut 13, together with the bolt 12, holds the supporting member 8 and journal box in assembled relationship.

Figure 3:
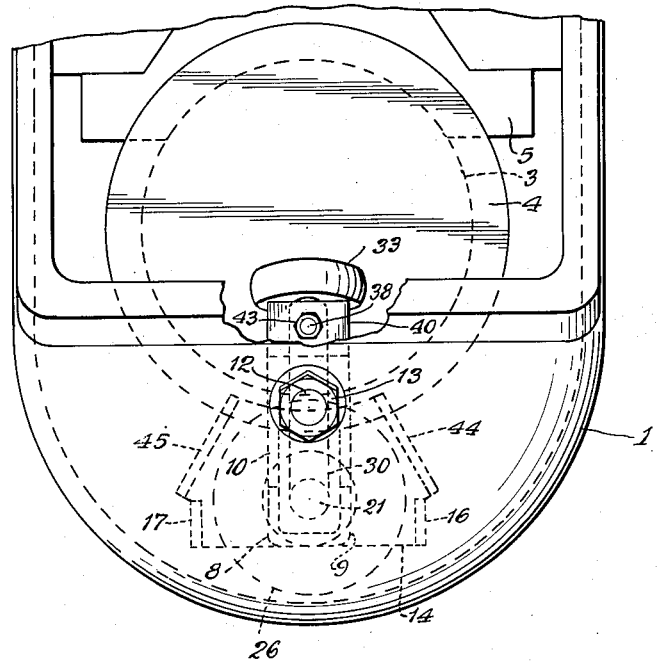
Fig. 3 is an end view of the journal box and lubricating attachment shown in Fig. 1.
Figure 4:
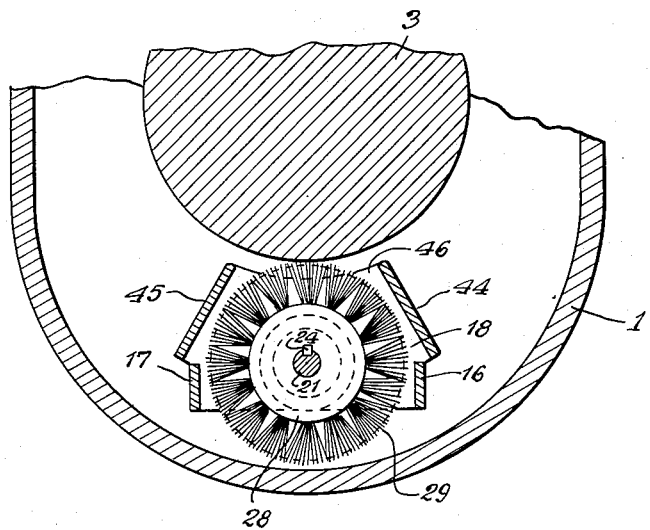
Fig. 4 is a sectional view of the assembly shown in Fig. 1 taken along the lines 4—4 of Fig. 1.

The portion 9 of the supporting member 8 terminates in an end plate 14 which is formed integrally with the portion 9 of the supporting member. End plate 14 has a bearing housing 15 formed therein. A pair of spaced side members 16 and 17, as will be seen best in Figs. 3 and 4, are formed integrally with the end plate 14. These members extend generally parallel with the axle 3 and are spaced apart a distance greater than the width of the supporting member 8. An end plate 18, similar to the end plate 14, is formed integrally with the other ends of the side members 16. End plate 18 has a bearing housing 19 in alignment with the bearing housing 15 formed in the end plate 14. Any suitable bearing 20 is supported in the bearing housing 19 for supporting one end of a power shaft 21, which is supported at its other end by any suitable bearing 22 supported in the bearing housing 15.

The distributor 7 includes a sleeve 23 which is keyed to the shaft 21, as at 24. The distributor 7 may be formed of nylon, rubber, or any suitable rubber substitute. A pair of disk-like members 25 and 26 are formed integrally with the sleeve 23 intermediate the ends of the sleeve 23. The diameter of these disk-like members is slightly less than the distance between the axle 3 and the lower wall of the journal box 1. Bristle holders 27 and 28 are formed integrally with the sleeve 23 at opposite ends of the sleeve which are adjacent to the end plates 14 and 18. Each of these bristle holders carries bristles 29 which are disposed evenly around the periphery of the bristle holders. The length of these bristles is such as to contact the axle 3 during rotation of the sleeve 23, whereas the disk-like elements 25 and 26 are always spaced a slight distance from the periphery of the axle 3. The bristles 29 form disk-like brushes.

During rotation of the sleeve 23, the disk-like elements 25, 26 and the disk-like brushes formed by the bristles 29 move through the pool of lubricant 6 and convey and distribute lubricant on the periphery of the axle 3. Lubricant particles carried by these elements will leave these elements during rotation thereof by reason of centrifugal force and create a lubricant spray for the axle 3.

A flexible cable 30 is joined to an end portion 31 of shaft 24 and is connected at its other end to a stub shaft 32 carrying a roller element 33. Roller element 33 is adapted for contact with the end face 4 of the axle 3. The roller 33 and stub shaft 32 are supported by a bifurcated lever 34 which straddles the angular portion 10 of the supporting member 8 and is pivotally connected thereto, as at 36. The roller 33 is held in frictional engagement with the end face 4 of the axle 3 by means of a spring and pin assembly 37. The assembly includes a pin 38 having a rounded head portion 39 bearing against the lever 34. The pin 38 is slidably received within an upstanding member 40 formed integrally with the angular portion 10 of the supporting member 8. A spring 41 surrounds pin 38 and extends between the head portion 39 of the pin and a seat 42 in the upstanding portion 40. Any suitable stop member, such as a nut 43 threaded onto the end of the pin 38, may limit movement of the pin 38 with respect to the upstanding portion 40. The spring and pin assembly constantly register the lever 34 toward the end face 4 of the axle 3, thus insuring frictional engagement between the roller 33 and end face 4 at all times. From the foregoing it will be apparent that the lubricant distributor 7 will be rotated during rotation of the axle 3, thus insuring distribution of lubricant on the axle 3 during such times that the vehicle supported by the axle 3 is in motion.

Figure 2:
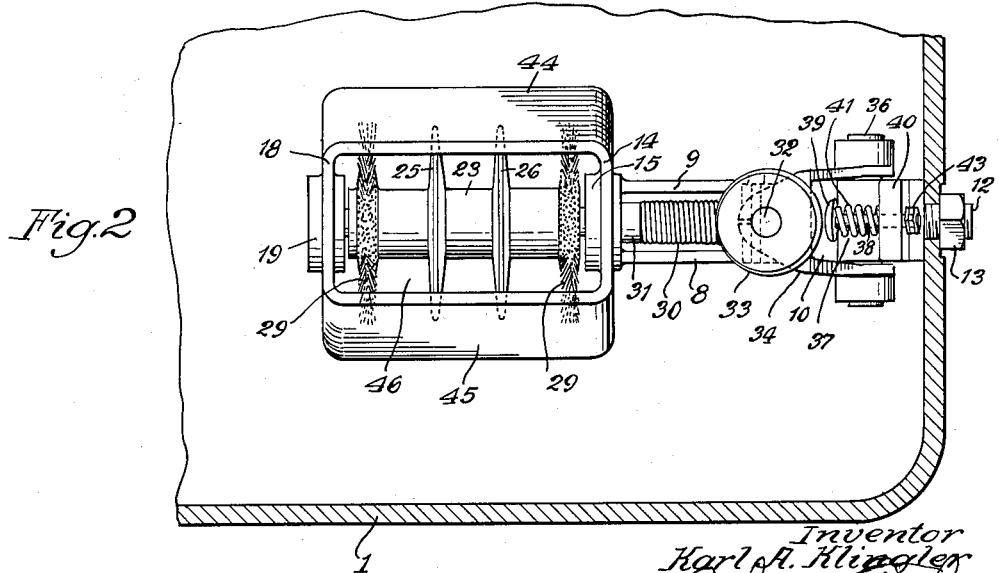
Fig. 2 is a sectional view of the device shown in Fig. 1 taken along the lines 2—2 of Fig. 1.

I employ means for confining the lubricant spray provided by the distributor 7 to a localized peripheral area on the axle 3. A pair of lubricant-confining members 44 and 45 are formed integrally with the end plates 14 and 18. These members 44 and 45 are spaced a slight distance from the members 25, 26 and 29 and are formed generally parallel to tangents to the peripheries of these members. The members 44 and 45 converge towards the axle 3, as will be seen best in Figs. 3 and 4, and terminate at points short of the periphery of the axle 3. The members 44 and 45, together with the end plates 14 and 18 and side members 16 and 17, form an enclosure for the distributor 7 and confine the distribution of lubricant to an area on the axle 3 which may be defined generally by the opening 46, which will be seen best in Fig. 2.

In operation, rotation of the axle 3 causes rotation of the distributor 7 and the attendant distribution of the lubricant spray on the axle 3. Lubricant distributed on the axle 3 will be worked throughout the length of the bearing portion of the axle 3 by the bearing engagement of the axle 3 with the brass 5. During those times when the lubricant is at a relatively low level in the journal box, the brushes formed by the bristle 29 will continue the lubricant distributing function. At those times the resiliency of the bristles 29 allows relative movement between the bristles and the sleeve 23. When the bristles contact the axle 3 and the lubricant in the reservoir, this relative movement provides an additional force tending to throw particles of lubricant to the periphery of the axle 3.

By adjusting the roller 33 with relation to the center of the axle 3 it is possible to vary the speed of rotation of the distributor 7 and thus vary the amount of lubricant distributed to the axle 3 during rotation of the axle 3.

Whereas I have shown and described an operative device, I wish it to be understood that this showing is to be taken in an illustrative or diagrammatic sense only; that there are many modifications of the device shown which fall within the scope of the invention which will be apparent to those skilled in the art. The scope of the invention, therefore, should be limited to the scope of the hereinafter appended claims.

I claim:

1. A journal box lubricating assembly including a rotatable journal and a journal box surrounding said journal, said journal box having lubricant reservoir in the lower portion thereof, a support between the journal and the lower portion of said box, a rotatable lubricant distributing member mounted on said support and adapted to move into said reservoir and into the proximity of said journal for distributing lubricant on said journal, a rotatable driving member carried by said support and engaged with the end face of said journal and means interconnecting said driving member and said first named member for rotation of said first named member in response to rotation of said driving member.

2. A journal box lubricating assembly including a rotatable journal and a journal box surrounding said journal, said journal box having a lubricant reservoir in the lower portion thereof, a support between the journal and the lower portion of said box, a rotatable lubricant distributing member mounted on said support and adapted to move into said reservoir and into the proximity of said journal for distributing lubricant on said journal, a rotatable driving member carried by said support and biased into frictional engagement with the end face of said journal, and means interconnecting said first named member with said driving member for rotation of said first named member in response to rotation of said journal and said driving member.

3. The structure of claim 2 characterized by and including a plurality of disk-like flexible members rotatably mounted on said support, each of said members being rotatable in response to rotation of said driving member to thereby move through the reservoir end into the proximity of said journal.

4. The structure of claim 2 characterized by and including a rotatable driving member having a frictional surface engageable with the end face of said journal, resilient means including a lever movably mounted on said support for supporting said driving member and a spring interposed between said lever and said support, to thereby force said lever and said driving member into engagement with the end face of said journal.

5. A lubricating device insertable between a journal box and journal including a generally elongated support having one end portion adapted for attachment to the journal box and another end portion rotatably supporting a plurality of flexible lubricant distributing members, a lever movably mounted on said support and resilient means for biasing said lever towards said distributing members, said lever having a frictional driving member rotatably mounted thereon and engageable with said journal when said support is inserted between said journal and said box, and means interconnecting said frictional driving member and said lubricant distributing member for rotation of said distributing members in response to rotation of said frictional driving member.

6. The structure of claim 5 characterized by and including a shaft rotatable with said lubricant distributing member and rotatably mounted on said support, said interconnecting means including a flexible shaft between said frictional driving member and said shaft.

7. The structure of claim 5 characterized by and including lubricant confining members carried by said support on opposite sides of said lubricant distributing members, said confining members being spaced to define a passage for a supply of lubricant developed by said distributing members.

References Cited in the file of this patent

UNITED STATES PATENTS

| 114,157 | Laman | Apr. 25, 1871 |
| 564,856 | Weber | July 28, 1896 |

FOREIGN PATENTS

| 248,608 | Great Britain | Mar. 11, 1926 |
| 260,237 | Italy | Sept. 11, 1928 |
| 677,556 | France | Mar. 12, 1930 |